United States Patent
Kang et al.

(10) Patent No.: US 10,535,007 B2
(45) Date of Patent: Jan. 14, 2020

(54) DETERMINING A SIMILARITY BETWEEN GRAPHS

(71) Applicant: International Business Machines Corporation, Armonk, NY (US)

(72) Inventors: U Kang, Pittsburgh, PA (US); Ravindranath Konuru, Tarrytown, NY (US); Hanghang Tong, Ossining, NY (US); Jimeng Sun, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 13/743,666

(22) Filed: Jan. 17, 2013

(65) Prior Publication Data
US 2014/0025689 A1    Jan. 23, 2014

Related U.S. Application Data

(60) Provisional application No. 61/637,378, filed on Apr. 24, 2012.

(51) Int. Cl.
G06F 16/2457 (2019.01)
G06N 5/04 (2006.01)
G06N 5/02 (2006.01)

(52) U.S. Cl.
CPC ......... *G06N 5/04* (2013.01); *G06F 16/24578* (2019.01); *G06N 5/02* (2013.01)

(58) Field of Classification Search
CPC ....... G06N 5/04; G06N 5/02; G06F 16/24578
See application file for complete search history.

(56) References Cited

U.S. PATENT DOCUMENTS

2006/0074821 A1* 4/2006 Cristianini .............. 706/12
2007/0100875 A1* 5/2007 Chi et al. ............. 707/102
(Continued)

FOREIGN PATENT DOCUMENTS

CN 101964053 A 2/2011
EP 2431918 A2 3/2012

OTHER PUBLICATIONS

Kang, U., Charalampos E. Tsourakakis, and Christos Faloutsos. "Pegasus: A peta-scale graph mining system implementation and observations." Data Mining, 2009. ICDM'09. Ninth IEEE International Conference on. IEEE, 2009.*
(Continued)

*Primary Examiner* — Boris Gorney
*Assistant Examiner* — James E Heffern
(74) *Attorney, Agent, or Firm* — Daniel P. Morris; Otterstedt, Wallace & Kammer, LLP

(57) ABSTRACT

A method for determining a similarity between a plurality of graphs includes inferring a low-rank representation of a first graph, inferring a low-rank representation of a second graph, wherein the low-rank representations of the first and second graphs are stored in memory, estimating a left interaction between the first and second graphs, estimating a middle interaction between the first and second graphs, estimating a right interaction between the first and second graphs, wherein the estimations are based on the low-rank representations of the first and second graphs stored in memory, and aggregating the left interaction, the middle interaction and the right interaction into a kernel, wherein the kernel is indicative of the similarity between the first and second graphs.

23 Claims, 8 Drawing Sheets

```
Algorithm 3 ARK-L: approximate random walk
kernel for labeled nodes
```
Input: Weight matrix $W_1$ of a graph $G_1$,
 weight matrix $W_2$ of a graph $G_2$,
 label matrices $L_1^{(1)}$ to $L_1^{(d_n)}$ of $G_1$,
 label matrices $L_2^{(1)}$ to $L_2^{(d_n)}$ of $G_2$,
 starting and ending probability $p_1$ and $q_1$ for $G_1$,
 starting and ending probability $p_2$ and $q_2$ for $G_2$,
 decay factor $c$.
Output: Approx. random walk kernel $\hat{k}(G_1, G_2)$
 1: $U_1 \Lambda_1 V_1^T \leftarrow W_1^T$; //SVD on $W_1^T$
 2: $U_2 \Lambda_2 V_2^T \leftarrow W_2^T$; //SVD on $W_2^T$
 3: $\tilde{\Lambda} \leftarrow ((\Lambda_1 \otimes \Lambda_2)^{-1} - c(\sum_{j=1}^{d_n} V_1^T L_1^{(j)} U_1 \otimes V_2^T L_2^{(j)} U_2))^{-1}$;
 4: $L \leftarrow (\sum_{j=1}^{d_n} q_1^T L_1^{(j)} U_1 \otimes q_2^T L_2^{(j)} U_2)$;
 5: $R \leftarrow (\sum_{j=1}^{d_n} V_1^T L_1^{(j)} p_1 \otimes V_2^T L_2^{(j)} p_2)$;
 6: $\hat{k}(G_1, G_2) \leftarrow (\sum_{j=1}^{d_n} (q_1^T L_1^{(j)} p_1)(q_2^T L_2^{(j)} p_2)) + cL\tilde{\Lambda}R$;

(56) References Cited

U.S. PATENT DOCUMENTS

2009/0265404 A1* 10/2009 Tzeng .......................... 708/208
2010/0223276 A1   9/2010 Al-Shameri
2011/0225159 A1   9/2011 Murray
2011/0302147 A1  12/2011 Dasdan
2012/0093417 A1   4/2012 Hido

OTHER PUBLICATIONS

Danai Koutra et al, "Algorithms for Graph Similarity and Subgraph Matching", Dec. 4, 2011.

* cited by examiner

FIG. 2B

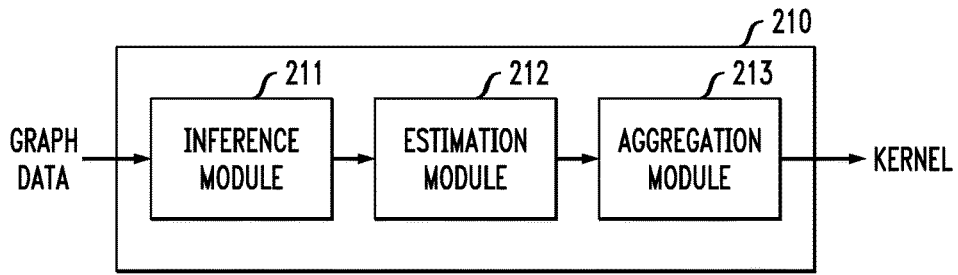

GRAPH DATA → [211 INFERENCE MODULE] → [212 ESTIMATION MODULE] → [213 AGGREGATION MODULE] → KERNEL

FIG. 3

| CASE | NORMALIZATION OF W | # OF NODE LABELS | EXACT | ARK |
|---|---|---|---|---|
| (a) | NORMALIZED | 1 | $O(n^3)$ | $O(n^2 r^4 + r^6 + mr)$ |
| (b) | UNNORMALIZED | 1 | $O(n^3)$ | $O((m+n)r + r^2)$ |
| (c) | NORMALIZED | $d_n$ | $O(m^2 i_F)$ | $O(d_n n^2 r^4 + r^6 + mr)$ |
| (d) | UNNORMALIZED | $d_n$ | $O(m^2 i_F)$ | $O(d_n n^2 r^4 + r^6 + mr)$ |

FIG. 4

Algorithm 1 ARK-U: approximate random walk kernel for unlabeled nodes and asymmetric $W$

Input: Adjacency matrix $A_1$ of a graph $G_1$,
  adjacency matrix $A_2$ of a graph $G_2$,
  starting and ending probability $p_1$ and $q_1$ for $G_1$,
  starting and ending probability $p_2$ and $q_2$ for $G_2$,
  decay factor $c$.

Output: Approx. random walk kernel $\hat{k}(G_1, G_2)$

1: $W_1 \leftarrow A_1 D_1^{-1}$; // row normalize $A_1$
2: $W_2 \leftarrow A_2 D_2^{-1}$; // row normalize $A_2$
3: $U_1 \Lambda_1 V_1^T \leftarrow W_1^T$; //SVD on $W_1^T$
4: $U_2 \Lambda_2 V_2^T \leftarrow W_2^T$; //SVD on $W_2^T$
5: $\tilde{\Lambda} \leftarrow ((\Lambda_1 \otimes \Lambda_2)^{-1} - c(V_1^T \otimes V_2^T)(U_1 \otimes U_2))^{-1}$;
6: $L \leftarrow (q_1^T U_1 \otimes q_2^T U_2)$;
7: $R \leftarrow (V_1^T p_1 \otimes V_2^T p_2)$;
8: $\hat{k}(G_1, G_2) \leftarrow (q_1^T p_1)(q_2^T p_2) + cL\tilde{\Lambda}R$;

*FIG. 5*

Algorithm 2 ARK-U+: approximate random walk kernel for unlabeled nodes and symmetric $W$

Input: Adjacency matrix $A_1$ of a graph $G_1$,
    adjacency matrix $A_2$ of a graph $G_2$
    starting and ending probability $p_1$ and $q_1$ for $G_1$,
    starting and ending probability $p_2$ and $q_2$ for $G_2$,
    decay factor $c$.

Output: Approx. random walk kernel $\hat{k}(G_1, G_2)$

1: $U_1 \Lambda_1 U_1^T \leftarrow A_1^T$; //eigen decomposition on $W_1$
2: $U_2 \Lambda_2 U_2^T \leftarrow A_2^T$; //eigen decomposition on $W_2$
3: $\tilde{\Lambda} \leftarrow ((\Lambda_1 \otimes \Lambda_2)^{-1} - cI)^{-1}$;
4: $L \leftarrow (q_1^T U_1 \otimes q_2^T U_2)$;
5: $R \leftarrow (U_1^T p_1 \otimes U_2^T p_2)$;
6: $\hat{k}(G_1, G_2) \leftarrow (q_1^T p_1)(q_2^T p_2) + cL\tilde{\Lambda}R$;

*FIG. 6*

Algorithm 3 ARK-L: approximate random walk kernel for labeled nodes

Input: Weight matrix $W_1$ of a graph $G_1$,
    weight matrix $W_2$ of a graph $G_2$,
    label matrices $L_1^{(1)}$ to $L_1^{(d_n)}$ of $G_1$,
    label matrices $L_2^{(1)}$ to $L_2^{(d_n)}$ of $G_2$,
    starting and ending probability $p_1$ and $q_1$ for $G_1$,
    starting and ending probability $p_2$ and $q_2$ for $G_2$,
    decay factor $c$.

Output: Approx. random walk kernel $\hat{k}(G_1, G_2)$

1: $U_1 \Lambda_1 V_1^T \leftarrow W_1^T$; //SVD on $W_1^T$
2: $U_2 \Lambda_2 V_2^T \leftarrow W_2^T$; //SVD on $W_2^T$
3: $\tilde{\Lambda} \leftarrow ((\Lambda_1 \otimes \Lambda_2)^{-1} - c(\sum_{j=1}^{d_n} V_1^T L_1^{(j)} U_1 \otimes V_2^T L_2^{(j)} U_2))^{-1}$;
4: $L \leftarrow (\sum_{j=1}^{d_n} q_1^T L_1^{(j)} U_1 \otimes q_2^T L_2^{(j)} U_2)$;
5: $R \leftarrow (\sum_{j=1}^{d_n} V_1^T L_1^{(j)} p_1 \otimes V_2^T L_2^{(j)} p_2)$;
6: $\hat{k}(G_1, G_2) \leftarrow (\sum_{j=1}^{d_n} (q_1^T L_1^{(j)} p_1)(q_2^T L_2^{(j)} p_2)) + cL\tilde{\Lambda}R$;

*FIG. 7 cont.(a)*
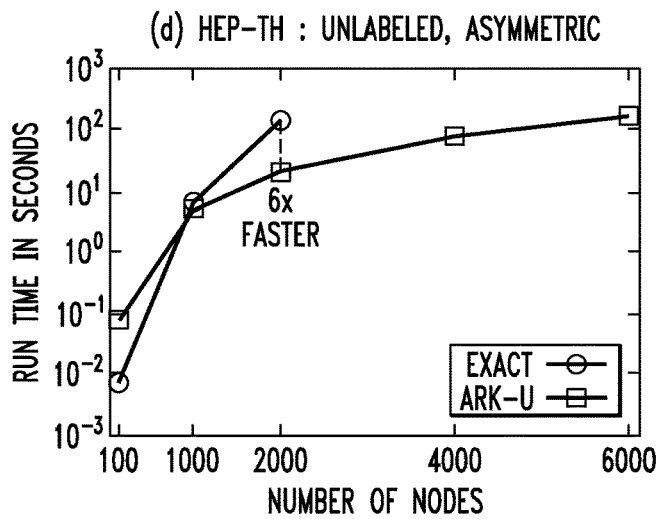
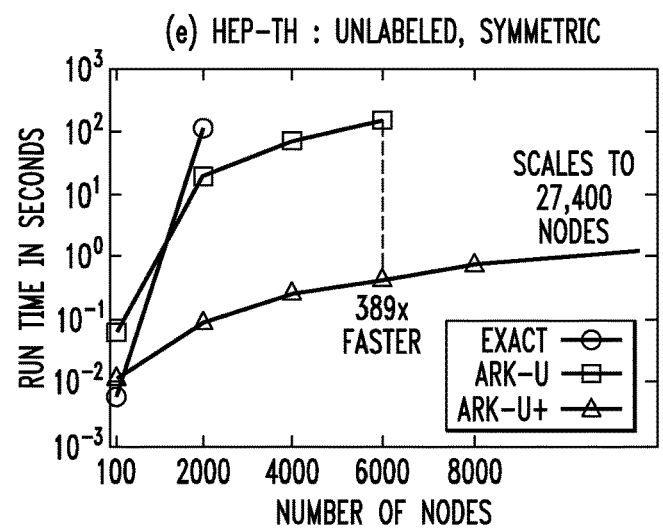
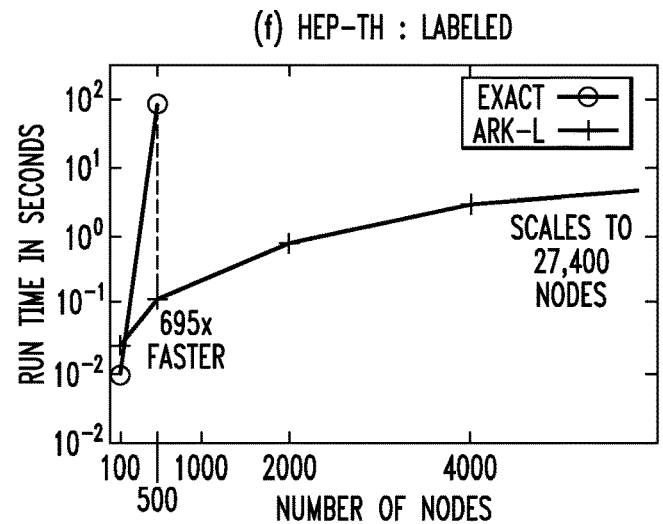

FIG. 7 cont.(b)
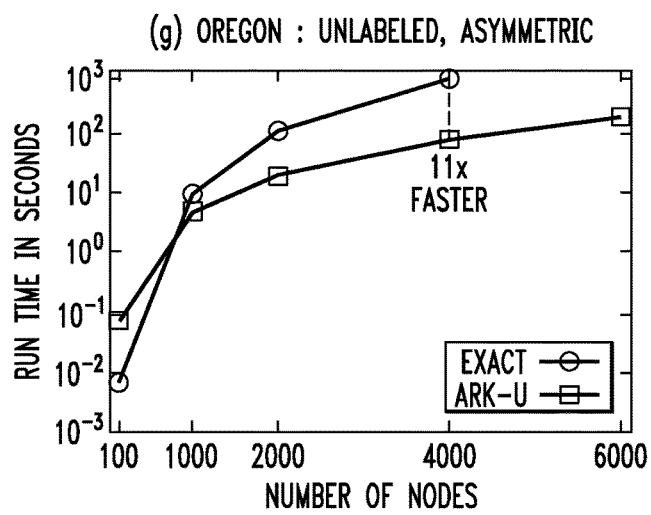
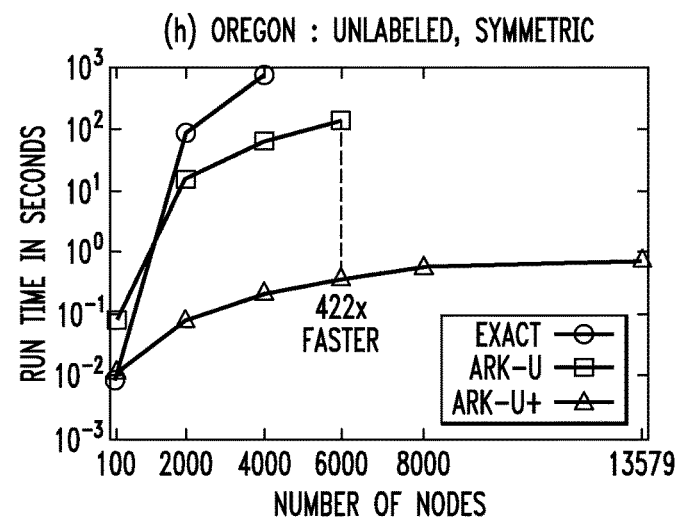
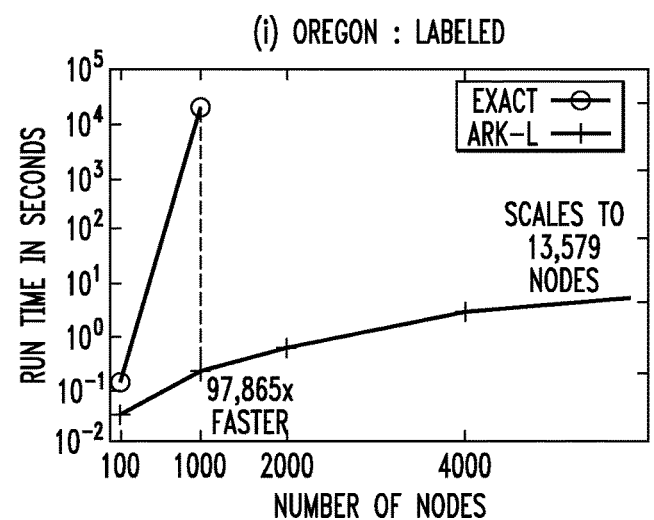

FIG. 8

| NODES | WWW | | | HEP-TH | | | OREGON | | |
|---|---|---|---|---|---|---|---|---|---|
| | ARK-U | ARK-U+ | ARK-L | ARK-U | ARK-U+ | ARK-L | ARK-U | ARK-U+ | ARK-L |
| 100 | 0.959 | 0.999 | 0.980 | 0.999 | 0.999 | 0.999 | 0.998 | 0.999 | 0.999 |
| 500 | 0.957 | 0.999 | 0.984 | 0.977 | 0.999 | 0.995 | 0.959 | 0.999 | 0.980 |
| 1000 | 0.930 | 0.999 | * | 0.962 | 0.999 | * | 0.939 | 0.999 | * |
| 1500 | 0.920 | 0.999 | * | 0.952 | 0.999 | * | 0.934 | 0.999 | * |
| 2000 | 0.913 | 0.999 | * | 0.946 | 0.930 | * | 0.928 | 0.999 | * |

FIG. 9

| $r^*$ | WWW | | | HEP-TH | | | OREGON | | |
|---|---|---|---|---|---|---|---|---|---|
| | ARK-U | ARK-U+ | ARK-L | ARK-U | ARK-U+ | ARK-L | ARK-U | ARK-U+ | ARK-L |
| 1 | 0.930 | 0.993 | 0.971 | 0.977 | 0.999 | 0.996 | 0.943 | 0.999 | 0.970 |
| 2 | 0.930 | 0.999 | 0.971 | 0.977 | 0.999 | 0.996 | 0.947 | 0.999 | 0.974 |
| 3 | 0.950 | 0.999 | 0.981 | 0.977 | 0.999 | 0.996 | 0.950 | 0.999 | 0.975 |
| 4 | 0.951 | 0.999 | 0.981 | 0.977 | 0.999 | 0.996 | 0.952 | 0.999 | 0.976 |
| 5 | 0.953 | 0.999 | 0.982 | 0.977 | 0.999 | 0.995 | 0.954 | 0.999 | 0.977 |
| 6 | 0.957 | 0.999 | 0.984 | 0.977 | 0.999 | 0.995 | 0.959 | 0.999 | 0.980 |
| 7 | 0.961 | 0.999 | 0.986 | 0.977 | 0.999 | 0.995 | 0.961 | 0.999 | 0.981 |
| 8 | 0.962 | 0.999 | 0.987 | 0.977 | 0.999 | 0.995 | 0.961 | 0.999 | 0.981 |
| 9 | 0.962 | 0.999 | 0.987 | 0.977 | 0.999 | 0.995 | 0.964 | 0.999 | 0.983 |
| 10 | 0.963 | 0.999 | 0.987 | 0.977 | 0.999 | 0.994 | 0.966 | 0.999 | 0.984 |
| 11 | 0.965 | 0.999 | 0.989 | 0.977 | 0.999 | 0.994 | 0.967 | 0.999 | 0.984 |
| 12 | 0.966 | 0.999 | 0.989 | 0.977 | 0.999 | 0.994 | 0.968 | 0.999 | 0.985 |
| 13 | 0.967 | 0.999 | 0.989 | 0.977 | 0.999 | 0.994 | 0.969 | 0.999 | 0.986 |
| 14 | 0.969 | 0.999 | 0.991 | 0.977 | 0.999 | 0.994 | 0.970 | 0.999 | 0.986 |
| 15 | 0.971 | 0.999 | 0.991 | 0.977 | 0.999 | 0.994 | 0.971 | 0.999 | 0.986 |
| 16 | 0.971 | 0.999 | 0.991 | 0.977 | 0.999 | 0.994 | 0.972 | 0.999 | 0.987 |
| 17 | 0.972 | 0.999 | 0.992 | 0.977 | 0.999 | 0.993 | 0.974 | 0.999 | 0.988 |
| 18 | 0.972 | 0.999 | 0.992 | 0.977 | 0.999 | 0.993 | 0.976 | 0.999 | 0.989 |
| 19 | 0.972 | 0.999 | 0.992 | 0.977 | 0.999 | 0.993 | 0.977 | 0.999 | 0.989 |
| 20 | 0.973 | 0.999 | 0.992 | 0.977 | 0.999 | 0.993 | 0.977 | 0.999 | 0.990 |

DETERMINING A SIMILARITY BETWEEN GRAPHS

CROSS REFERENCE TO RELATED APPLICATION

This application claims priority to U.S. Provisional Patent Application Ser. No. 61/637,378, filed Apr. 24, 2012, the contents of which are hereby incorporated by reference in their entirety.

This invention was made with Government support under Contract No.: W911NF-11-C-0200 (Defense Advanced Research Projects Agency (DARPA)). The Government has certain rights in this invention.

BACKGROUND

The present disclosure relates generally to determining similarities between graphs, and more particularly, to a random walk graph kernel determination.

Many real-world, complex objects with structural properties can be modeled as graphs. For example, the World Wide Web can be represented as a graph with web-pages as nodes and hyperlinks as edges. In another example, a patient's medical data can be modeled as a symptom-lab test graph, which can be constructed from his/her medical records, providing an indicator of the structure information of possible disease s/he carries (e.g., the association between a particular symptom and some lab test, the co-occurrence of different symptom).

Random walk graph kernel has been used as a tool for various data mining tasks including classification and similarity computation. Despite its usefulness, however, it suffers from its expensive computational costs which are at least $O(n^3)$ or $O(m^2)$ for graphs with n nodes and m edges.

BRIEF SUMMARY

According to an embodiment of the present disclosure, a method for determining a similarity between a plurality of graphs includes inferring a low-rank representation of a first graph, inferring a low-rank representation of a second graph, wherein the low-rank representations of the first graph and the second graph are stored in a memory, estimating a left interaction between the first and second graphs, estimating a middle interaction between the first and second graphs, estimating a right interaction between the first and second graphs, wherein the estimations of the left interaction, the middle interaction and the right interaction are based on the low-rank representations of the first graph and the second graph stored in the memory, and aggregating the left interaction, the middle interaction and the right interaction into a kernel, wherein the kernel is indicative of the similarity between the first and second graphs.

According to an embodiment of the present disclosure, a method for building an index for a first graph and a second graph includes inferring a low-rank representation of each of the first graph and the second graph, each of the low-rank representations including a left matrix, a middle matrix, and a right matrix, wherein the low-rank representations are stored in a memory, estimating a left interaction by conducting a first linear operation between the information and the left matrices based on the low-rank representations stored in the memory, estimating a right interaction by conducting a second linear operation between the side information and the right matrices based on the low-rank representations stored in the memory, estimating a middle interaction between the left matrices and the right matrices based on the low-rank representations stored in the memory and aggregating the left interaction, the middle interaction and the right interaction to output the index.

According to an embodiment of the present disclosure, a method for comparing data includes obtaining feature data of a first graph and a second graph, representing the feature data in a matrix, decomposing the matrix into a plurality of submatrices, and cross-comparing entries of the plurality of submatrices at a left, a middle, and a right of each matrix of the plurality of submatrices and determining a similarity between the first graph and the second graph.

BRIEF DESCRIPTION OF THE SEVERAL VIEWS OF THE DRAWINGS

Preferred embodiments of the present disclosure will be described below in more detail, with reference to the accompanying drawings:

FIG. 2B is an illustrative system for determining a kernel according to an embodiment of the present disclosure;

FIG. 3 shows a summary of running times for different methods according to an embodiment of the present disclosure;

FIG. 4 is an exemplary algorithm for determining a kernel given two graphs according to an embodiment of the present disclosure;

FIG. 5 is an another exemplary algorithm for determining a kernel given two graphs according to an embodiment of the present disclosure;

FIG. 6 is an another exemplary algorithm for determining a kernel given two graphs according to an embodiment of the present disclosure;

FIG. 8 shows the accuracy of different exemplary methods according to an embodiment of the present disclosure;

FIG. 9 shows the accuracy of different exemplary methods according to an embodiment of the present disclosure.

DETAILED DESCRIPTION

Embodiments of the present disclosure relate to a method for determining a scalable random walker. More particularly, a method is described for determining an approximate random walk kernel (ARK).

Many real graphs have lower intrinsic ranks, compared with the size of the graphs. According to an exemplary embodiment of the present disclosure, an ARK method uses a set of methods to leverage low-rank structures as an intermediate operation, speeding the determination of the random walk graph kernel. More particularly, an ARK method exploits the low rank structures to determine random walk graph kernels in $O(n^2)$ or $O(m)$ time.

Herein, the following symbols are used:

| Symbol | Definition |
| --- | --- |
| G | a graph |
| n | number of nodes in a graph |
| m | number of edges in a graph |
| A | adjacency matrix of a graph |
| $k(G_1, G_2)$ | exact graph kernel function on graphs $G_1$ and $G_2$ |
| $\hat{k}(G_1, G_2)$ | approximate graph kernel function on graphs $G_1$ and $G_2$ |
| W | weight matrix in random walk kernel |
| c | decay factor in random walk kernel |
| $d_n$ | number of distinct node labels |
| r | reduced rank after low rank approximation |

Figure 1:
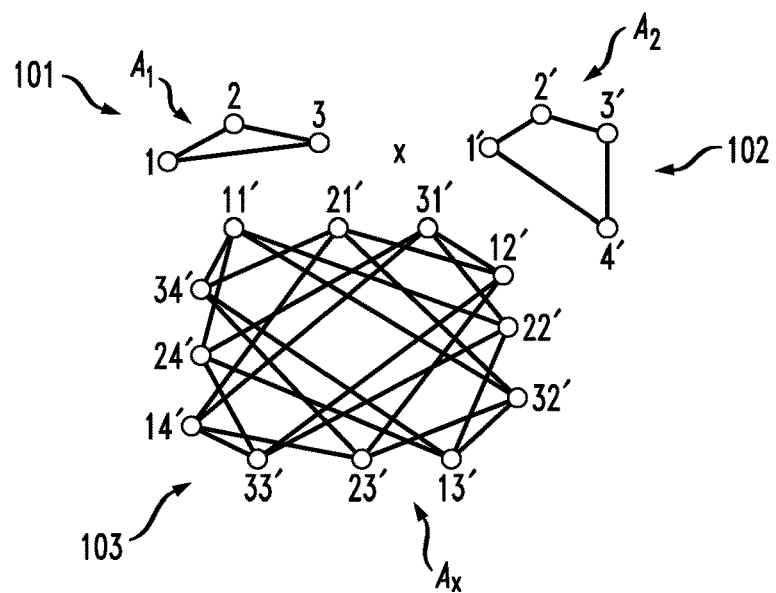
FIG. 1 is an illustration of the direct product of two graphs according to an embodiment of the present disclosure.

As described above, a random walk graph kernel can be used for classification and measuring similarities of graphs. Referring to FIG. 1, given two graphs $A_1$ and $A_2$ (101 and 102, respectively), the random walk graph kernel can be used to determine the number of common walks in two graphs, exemplified by the direct product $A_x$ (103). Two walks are common if the lengths of the walks are equal, and the label sequences are the same for nodes/edges in labeled graphs. The number of common walks is used to measure the similarity of two graphs.

Figure 2A:
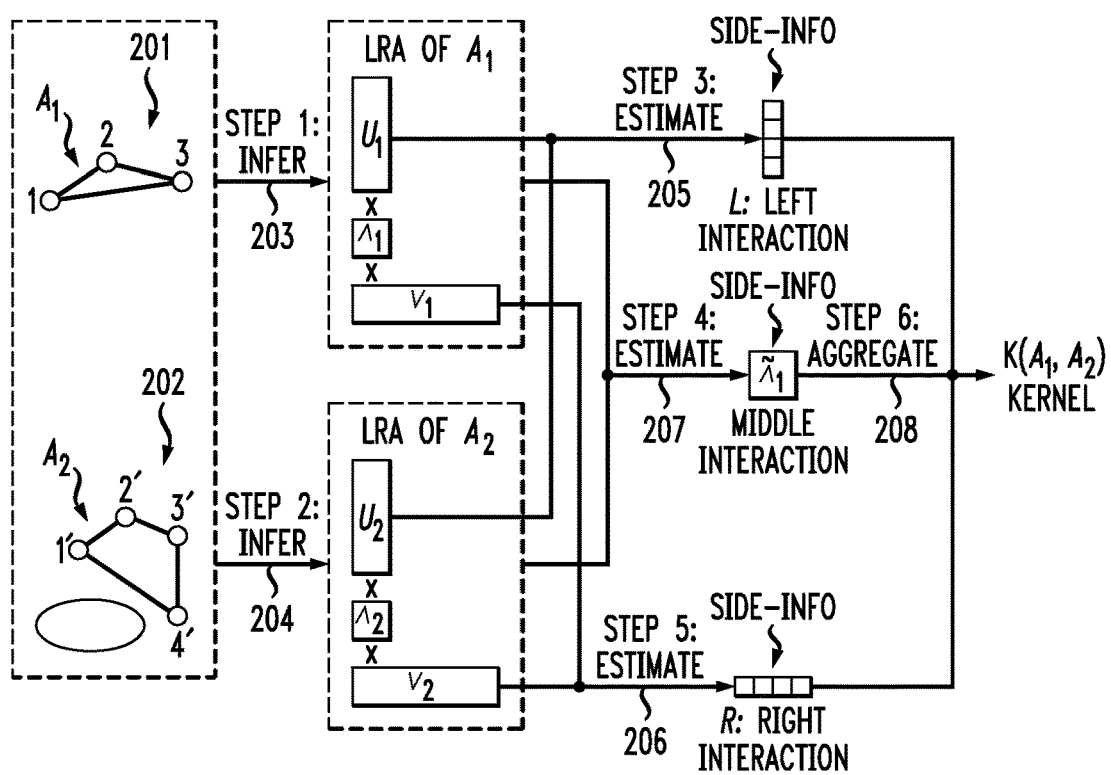
FIG. 2A is an illustrative method for determining a kernel according to an embodiment of the present disclosure.

According to an exemplary embodiment of the present disclosure and referring to FIG. 2A, the kernel/similarity between two input graphs (201 and 202) can be determined by inferring a low-rank representation of a first graph at 203 (or low-rank approximation (LRA)), inferring a low-rank representation of a second graph at 204, estimating a left interaction between the first and second graphs using side information (e.g., starting vectors and stopping vectors of the respective graphs) at 205, estimating a right interaction between the first and second graphs using side information (e.g., starting vectors and stopping vectors of the respective graphs) at 206, estimating a middle interaction between the first and second graphs at 207, and aggregating the left, middle and right interactions and determining a similarity between the first and second graphs at 208.

According to an exemplary embodiment of the present disclosure and referring to FIG. 2B, a system 210 comprising distinct software modules embodied on one or more tangible computer readable storage media can be provided. The system includes an inference module 211, an estimation module 212 and an aggregation module 213. The inference module 211 can perform method steps of determining a weight matrix for a graph and inferring an LRA of the graph, for example, as shown in lines 1-4 of exemplary Algorithm 1 in FIG. 4. The estimation module 212 can perform method steps of estimating left, right and middle interactions, for example, as shown in lines 5-7, respectively, in FIG. 4. The aggregation module 213 can perform method steps of aggregating the left, right and middle interactions, for example as shown in line 8 of FIG. 4. The following with describe exemplary embodiments of the present disclosure in more detail.

According to an exemplary embodiment of the present disclosure, a random walk graph kernel for the unlabeled and unnormalized case can be derived. The random walk graph kernel can be generalized to labeled and normalized cases. Given two graphs $G_1=\{V_1,E_1\}$ and $G_2=\{V_2,E_2\}$, the direct product graph $G_x=\{V_x,E_x\}$ of $G_1$ and $G_2$ is a graph with the node set $V_x=\{(v_1,v_2)|v_1 \in V_1, v_2 \in V_2\}$, and the edge set $E_x=\{((v_{11},v_{21}),(v_{12},v_{22})) \in E_1,(v_{21},v_{22}) \in E_2\}$. A random walk on the direct product graph $G_x$ can be said to be equivalent to the simultaneous random walks on $G_1$ and $G_2$. Let $p_1$ and $p_2$ be starting vectors of the random walks on $G_1$ and $G_2$, respectively. Stopping vectors $q_1$ and $q_2$ can be defined similarly. The number of length l common walks on the direct product graph $G_x$ can be given by $(q_1 \otimes q_2)(W_1^T \otimes W_2^T)^l(p_1 \otimes p_2)$, where $W_1$ and $W_2$ are the adjacency matrices of $G_1$ and $G_2$, respectively. Discounting the longer walks by the decay factor c, and summing up all the common walks for all different lengths, an exemplary random walk graph kernel can be expressed as:

$$k(G_1, G_2) = \sum_{l=0}^{\infty} (q_1 \otimes q_2)(W_1^T \otimes W_2^T)^l(p_1 \otimes p_2)$$

$$= (q_1 \otimes q_2)(I - c(W_1^T \otimes W_2^T))^{-1}(p_1 \otimes p_2).$$

More generally, the random walk graph kernel can be defined as follows.

Let $G_1$ and $G_2$ be two graphs. Let $p_1$ and $p_2$ be the starting vectors of the random walks on $G_1$ and $G_2$, respectively. The stopping vectors $q_1$ and $q_2$ can be defined similarly. The random walk graph kernel $k(G_1,G_2)$ can be determined by:

$$k(G_1,G_2) := q^T(I-cW)^{-1}p, \qquad \text{Eq. (1)}$$

where W is a weight matrix, c is a decay factor, $p=p_1 \otimes p_2$, and $q=q_1 \otimes q_2$.

The weight matrix W can be determined by a normalization and labels on nodes/edges.

Referring to the normalization: Let $A_1$ and $A_2$ be the adjacency matrices of $G_1$ and $G_2$, respectively. For an unnormalized case, the weight matrix can be given by:

$$W = A_1^T \otimes A_2^T.$$

For a normalized case, the weight matrix can be given by:

$$W = A_1^T D_1^{-1} \otimes A_2^T D_2^{-1},$$

where $D_1$ and $D_2$ are diagonal matrices whose $i^{th}$ diagonal elements are given by $\Sigma_j A_1(i,j)$ and $\Sigma_j A_2(i,j)$, respectively.

Referring to labels: Nodes and edges can be labeled. Consider the case of node labeled graphs. Let $G_1$ have $n_1$ nodes and $G_2$ have $n_2$ nodes. Let $l_1$ and $l_2$ be the node label vectors of $G_1$ and $G_2$, respectively. The $((i-1) \cdot n_2+j)^{th}$ row of the weight matrix W are zeroed out if the $i^{th}$ element $l_1(i)$ of $l_1$ and the $j^{th}$ element $l_2(j)$ of $l_2$ do not have the same labels. Consider now edge labeled graphs. Let $W_1$ and $W_2$ be the normalized or unnormalized adjacency matrices of $G_1$ and $G_2$, respectively. The $((i_1-1) \cdot n_2+i_2,(j_1-1) \cdot n_2+j_2)^{th}$ element of W is 1 if and only if the edge labels of $W_1^T(i_1,j_1)$ and $W_2^T(i_2,j_2)$ are the same.

Referring now to various exemplary exact methods for determining a random walk graph kernel that follow, assume that both the graphs $G_1$ and $G_2$ have n nodes and m edges.

In a naive method the Equation (1) can be computed by inverting the $n^2 \times n^2$ matrix W. Since inverting a matrix takes time proportional to the cube of the number of rows/columns, the running time is $O(n^6)$.

In another example, if the weight matrix can be decomposed into one or two sums of Kronecker products, a Sylvester method can be used to solve the Equation (1) in $O(n^3)$ time. In the Sylvester method, the two graphs need to have the same number of nodes. Further, the theoretical running time of the Sylvester method on the weight matrix composed of more than two Kronecker products is unknown.

For unlabeled and unnormalized matrices, a spectral decomposition method runs in $O(n^3)$ time. The problem of spectral decomposition method is that it can't run on the labeled graph or normalized matrix.

In a further example, a conjugate gradient (CG) method can be used to solve linear systems. To use CG for determining random walk graph kernel, solve $(I-cWx=p)$ for $x$ using CG, and determine $q^T x$. Each iteration of CG takes $O(m^2)$ since the most expensive operation is the matrix-vector multiplication. Thus CG takes $O(m^2 i_F)$ time where $i_F$ denote the number of iterations. A problem of the CG method is its high memory requirement: it requires $O(m^2)$ memory.

In yet another example, a fixed point iteration method solves $(I-cW)x=p$ for $x$ by iterative matrix-vector multiplications. Similar to CG, the fixed point iteration method takes $O(m^2 i_F)$ time for $i_F$ iterations, and has the same problems of requiring $O(m^2)$ memory.

According to an embodiment of the present disclosure, in an approximate random walk kernel (ARK) method, a set of approximation algorithms can be used to determine the random walk graph kernel. According to an embodiment of the present disclosure, approximations of the graph(s), along with a starting vector and a stopping vector for each graph, can be stored in less memory than the entire graph and may not suffer an 'out of memory' error, such as in a case where a graph is too large to be stored in a memory. FIG. 3 shows a summary 300 of the running time comparison of an ARK method and the exact algorithms. Unlabeled graphs correspond to the cases (a) and (b). Node labeled graphs correspond to the cases (c) and (d).

Referring to the unlabeled graphs and an asymmetric W (ARK-U, defined below), consider node unlabeled graphs with the normalized weight matrix, which correspond to the case (a) in FIG. 3. Let two graphs $G_1$ and $G_2$ have the adjacency matrices $A_1$ and $A_2$, respectively. Let $W_1 = A_1 D_1^{-1}$ and $W_2 = A_2 D_2^{-1}$ be the row normalized adjacency matrix of $G_1$ and $G_2$, where $D_1$ and $D_2$ are diagonal matrices whose $i^{th}$ diagonal elements are given by $\Sigma_j A_1(i,j)$ and $\Sigma_j A_2(i,j)$, respectively. In this setting, the weight matrix W can be given by:

$$W = W_1^T \otimes W_2^T$$

Since the W matrix is large (e.g., including hundreds of nodes), W can be approximated using low-rank approximations. More precisely, the r-approximation of a matrix can be defined as follows.

Given a matrix $A$, the r-approximation of $A$ is a matrix $\hat{A}$ satisfying the following equation:

$$\|A-\hat{A}\|_F \leq \min_{Z|rank(Z)=r} \|A-Z\|_F, \quad \text{Eq. (2)}$$

meaning that $\hat{A}$ provides a better approximation to $A$ than the best rank-r approximation.

An approximate random walk kernel can be defined as follows.

Given a random walk graph kernel function $k(G_1,G_2):=q^T(I-cW)^{-1}p$, an approximate random walk graph kernel $\hat{k}(G_1,G_2)$ can be given by:

$$\hat{k}(G_1,G_2):=q^T(I-c\hat{W})^{-1}p$$

where $\hat{W}$ is a low rank approximation of W.

The $\hat{W}$ matrix needs to be as close as possible to W, while preserving a low rank. That is, $\hat{W}$ can be an r-approximation of W. It is well known that the singular value decomposition (SVD) gives a good (or best) low rank approximation. Thus, one approach to get the r-approximation of W is to use rank-r SVD of W. However, such a method has a running time $O(m^2 r)$, and the W matrix needs to be explicitly constructed.

According to an embodiment of the present disclosure, the SVD of $W_1^T$ and $W_2^T$ can be used to determine the r-approximation of the weight matrix W. This approach may not need to explicitly construct the W matrix. This method is referred to as Ark-U. Algorithm 1, shown in FIG. 4, gives an exemplary approximation method.

The Algorithm 1 for Ark-U gives the approximate random walk kernel:

$$\hat{k}(G_1,G_2) = q^T(I-c\hat{W})^{-1}p, \quad \text{Eq. (3)}$$

where $\hat{W}$ is the r-approximation of $W = W_1 \otimes W_2$.

As a proof of Algorithm 1: Let $W_1^T = U_1 \Lambda_1 V_1^T$ and $W_2^T = U_2 \Lambda_2 V_2^T$ be the top r singular value decompositions of $W_1^T$ and $W_2^T$. From the standard result of linear algebra, $$\hat{W} = (U_1 \otimes U_2)(\Lambda_1 \otimes \Lambda_2)(V_1^T \otimes V_2^T)$$

is a singular value decomposition. The $\hat{W}$ satisfies $\|W-\hat{W}\|_F \leq \min_{Z|rank(Z)=r}\|W-Z\|_F$ since the diagonal elements of the matrix $\Lambda_1 \otimes \Lambda_2$ contain top r largest eigenvalues of $W_1^T \otimes W_2^T$.

Thus, $$\begin{aligned}
q^T(I-c\hat{W})^{-1}p &= q^T(I-c(U_1 \otimes U_2)(\Lambda_1 \otimes \Lambda_2)(V_1^T \otimes V_2^T))^{-1}p \\
&= q^T(I+c(U_1 \otimes U_2)\tilde{\Lambda}(V_1^T \otimes V_2^T))p \\
&= q^T p + cq^T(U_1 \otimes U_2)\tilde{\Lambda}(V_1^T \otimes V_2^T)p \\
&= (q_1^T p_1)(q_2^T p_2) + c(q_1^T U_1 \otimes q_2^T U_2)\tilde{\Lambda}(V_1^T p_1 \otimes V_2^T p_2),
\end{aligned}$$

where the second equality comes from the Sherman-Morrison Lemma.

Referring to the time and the space complexities of Algorithm 1, note that the time complexity $O(n^2 r^4 + mr + r^6)$ of Ark-U is smaller than the best exact algorithm's complexity $O(n^3)$ since $n \gg rn \gg r$ as shown in FIG. 3.

More particularly, the time complexity of Ark-U takes $O(n^2 r^4 + mr + r^6)$ time. Here, the top r decompositions in lines 2 and 4 cost $O(nr + r^4)$. Determining $\tilde{\Lambda}$ in line 5 takes $O(n^2 r^4 + mr + r^6)$. Determining lines 6, 7 and 8 takes $O(nr + r^4)$.

Further, the space complexity of Ark-U uses $O(m+n^2 r^2)$ space. Here, the storage of $W_1$ and $W_2$ use $O(m)$ space. The top r decompositions in lines 3 and 4 use $O(nr)$ space. Lines 5 to 8 use $O(n^2 r^2)$ space, thus making the total space complexity $O(m+n^2 r^2)$.

Ark-U can be used for both the symmetric and the asymmetric weight matrices. For symmetric weight matrix, Ark-U+ is another exemplary approximation algorithm. Ark-U+ handles the case (b) in FIG. 3.

To describe the weight matrix W in this setting, assume two graphs $G_1$ and $G_2$ have the symmetric adjacency matrices $A_1$ and $A_2$, respectively. Then, the weight matrix W can be given by:

$$W = A_1^T \otimes A_2^T, \quad \text{Eq. (4)}$$

where W is also symmetric by the nature of Kronecker products. According to an embodiment of the present disclosure, the eigen decomposition can be used to determine the r-approximation of W. Since the eigen decomposition and the SVD on symmetric matrices are different only up to signs, the eigen decomposition gives the correct r-approximation. Computationally, only one $n \times r$ eigenvectors needs to be stored, instead of two $n \times r$ singular vectors. Algorithm 2, shown in FIG. 5, gives an exemplary method for Ark-U+ for symmetric W.

More particularly, Ark-U+ gives the approximate random walk kernel:

$$\hat{k}(G_1,G_2) = q^T(I-c\hat{W})^{-1}p$$

where $\hat{W}$ is the r-approximation of $W=W_1 \otimes W_2$.

As a proof of Algorithm 2: Let $A_1^T = U_1\Lambda_1 U_1^T$ and $A_2^T = U_2\Lambda_2 U_2^T$ be the top r singular value decompositions of $A_1$ and $A_2$, respectively. From the standard result of linear algebra, $$\hat{W} = (U_1 \otimes U_2)(\Lambda_1 \otimes \Lambda_2)(U_1^T \otimes U_2^T), \quad \text{Eq. (5)}$$

is a singular value decomposition. The $\hat{W}$ satisfies $\|W-\hat{W}\|_F \leq \min_{Z|rank(Z)=r}\|W-Z\|_F$ since the diagonal elements of the matrix $\Lambda_1 \otimes \Lambda_2$ contain top r largest eigenvalues of $A_1^T \otimes A_2^T$.

Thus, $$q^T(I-cW)^{-1}p = q^T(I-c(U_1 \otimes U_2)(\Lambda_1 \otimes \Lambda_2)(U_1^T \otimes U_2^T))^{-1}p$$
$$= q^T(I+c(U_1 \otimes U_2)\tilde{\Lambda}(U_1^T \otimes U_2^T))p$$
$$= q^Tp + cq^T(U_1 \otimes U_2)\tilde{\Lambda}(U_1^T \otimes U_2^T)p$$
$$= (q_1^Tp_1)(q_2^Tp_2) + c(q_1^TU_1 \otimes q_2^TU_2)\tilde{\Lambda}(U_1^Tp_1 \otimes U_2^Tp_2),$$

where the second equality comes from the Sherman-Morrison Lemma.

Referring to the time and the space complexities of Algorithm 2, note that the time and the space complexity of Ark-U+ is smaller than those of Ark-U due to the exploitation of the symmetricity.

More particularly, the time complexity of Ark-U+ takes $O((m+n)+r+r^2)$ time. Here, the top r decompositions in lines 1 and 2 cost $O(mr)$. Computing $\tilde{\Lambda}$ in line 3 takes $O(r^2)$. Computing line 4, 5 and 6 takes $O(nr+r^2)$.

The space complexity of Ark-U+ uses $O(m+nr+r^2)$ space. Here, the storage of $W_1$ and $W_2$ uses $O(m)$ space. The top r decompositions in lines 3 and 4 uses $O(nr)$. Lines 5 to 8 use $O(nr+r^2)$ space, thus making the total space complexity $O(m+nr+r^2)$.

In Ark-U+, the difference of the exact and the approximate random walk kernel (e.g., how close is the approximate random walk kernel $\hat{k}(G_1,G_2)$ to the exact kernel $k(G_1,G_2)$) can be considered to be bounded by:

$$|k(G_1,G_2) - \hat{k}(G_1,G_2)| \leq \sum_{(i,j)\notin F}\left|\frac{c\lambda_1^{(i)}\lambda_2^{(j)}}{1-c\lambda_1^{(i)}\lambda_2^{(j)}}\right|, \quad \text{Eq. (6)}$$

where $\lambda_1^{(i)}$ and $\lambda_2^{(i)}$ are the $i^{th}$ largest eigenvalue of $\Lambda_1$ and $\Lambda_2$, respectively, and $F=\{(a,b)|a,b\in[1,k]\}$ is the set of pairs (a,b) where both a and b are in the range of [1,k].

As a proof of the error bound: Let $W = A_1^T \otimes A_2^T$. Then, $(U_1 \otimes U_2)(\Lambda_1 \otimes \Lambda_2)(U_1^T \otimes U_2^T)$ is an eigen decomposition of W, which includes top k largest eigenvalues of W. Let $u_1^{(i)}$ and $u_2^{(i)}$ be the $i^{th}$ column of $U_1$ and $U_2$, respectively. Then, $\tilde{u}^{(i,j)} := u_1^{(i)} \otimes u_2^{(j)}$ is the eigenvector of W with the corresponding eigenvalue $\lambda_1^{(i)}\lambda_2^{(j)}$. It follows that:

$$(I-cW)^{-1} = I + c(U_1 \otimes U_2)\tilde{\Lambda}(U_1^T \otimes U_2^T)$$
$$= I + \sum_{i,j\in[1,n]}\tilde{\lambda}^{(i,j)}\tilde{u}^{(i,j)}(\tilde{u}^{(i,j)})^T,$$

where $\tilde{\Lambda} \approx ((\Lambda_1 \otimes \Lambda_2)^{-1} - cI)^{-1}$, and $\tilde{\lambda}^{(i,j)} \approx \frac{c\lambda_1^{(i)}\lambda_2^{(j)}}{1-c\lambda_1^{(i)}\lambda_2^{(j)}}$.

Now, consider an exemplary approximation: Let $\hat{W}$ be the W matrix from top k low rank approximations of $W_1$ and $W_2$, as shown in Equation (3.8). Then, $$(I+c\hat{W})^{-1} = I + \sum_{i,j\in[1,k]}\tilde{\lambda}^{(i,j)}\tilde{u}^{(i,j)}(\tilde{u}^{(i,j)})^T.$$

Thus, $$|k(G_1,G_2) - \hat{k}(G_1,G_2)| = |q^T(I-cW)^{-1}p - q^T(I-c\hat{W})^{-1}p|$$
$$= \left|q^T\left(\sum_{(i,j)\notin F}\frac{c\lambda_1^{(i)}\lambda_2^{(j)}}{1-c\lambda_1^{(i)}\lambda_2^{(j)}}\tilde{u}^{(i,j)}(\tilde{u}^{(i,j)})^T\right)p\right|$$
$$\leq \|q^T\|_2 \cdot \left\|\sum_{(i,j)\notin F}\frac{c\lambda_1^{(i)}\lambda_2^{(j)}}{1-c\lambda_1^{(i)}\lambda_2^{(j)}}\tilde{u}^{(i,j)}(\tilde{u}^{(i,j)})^T\right\|_F \cdot$$
$$\|p\|_2$$
$$\leq \sum_{(i,j)\notin F}\left|\frac{c\lambda_1^{(i)}\lambda_2^{(j)}}{1-c\lambda_1^{(i)}\lambda_2^{(j)}}\right|,$$

where the last inequality uses:

$\|q^T\|_2 \leq \|q^T\|_1 = 1$, $\|p\|_2 \leq \|p\|_1 = 1$, and $\|\Sigma_i a_i u_i u_i^T\|_F = \sqrt{tr(\Sigma_i a_i^2 u_i u_i^T)} = \sqrt{\Sigma_i a_i^2 \cdot tr(u_i u_i^T)} = \sqrt{\Sigma_i a_i^2} \leq \Sigma_i|a_i|$ for any real numbers $a_i$ and orthonormal vectors $u_i$.

According to an exemplary embodiment of the present disclosure, an Ark-L method is an approximation method to determine a random walk graph kernel on node labeled graphs. As discussed above, Ark-L addresses the cases (c) and (d) in FIG. 3.

As described above, the weight matrix W for node labeled graphs can be constructed by zeroing out rows of the Kronecker products of normalized or unnormalized matrices. More particularly, given the normalized or unnormalized adjacency matrices $W_1$ and $W_1$ of $G_1$ and $G_2$, respectively, the weight matrix W can be given by:

$$W = \tilde{L}(W_1^T \otimes W_2^T),$$

where $\tilde{L}$ is a diagonal matrix whose $(i,i)^{th}$ element is 0 if the $i^{th}$ row of $(W_1^T \otimes W_2^T)$ is zeroed out due to label inconsistency, or 1 otherwise. Let $L_1^{(j)}$ be a diagonal matrix whose $i^{th}$ element is 1 if the node i of the graph $G_1$ has the label j, and 0 otherwise. $L_2^{(j)}$ can be defined similarly for the graph $G_2$. Then, $\tilde{L}$ can be expressed by the sums of Kronecker products:

$$\tilde{L} = \sum_{j=1}^{d_n} L_1^{(j)} \otimes L_2^{(j)}$$

where $d_n$ is the number of distinct node labels.

An exemplary approximation method Ark-L for a random walk kernel on node labeled graphs is given in Algorithm 3, FIG. 6. Here, assume that $W_1$ and $W_2$ can be either row-normalized or unnormalized adjacency matrix of $G_1$ and $G_2$, respectively.

The Algorithm 3 for Ark-L gives the approximate random walk kernel:

$$\hat{k}(G_1, G_2) = q^T(I - c\hat{W})^{-1}p, \quad \text{Eq. (7)}$$

where $\tilde{W} = \tilde{L}W_r$, and $W_r$ is the r-approximation of $W_1 \otimes W_2$.

As a proof of Algorithm 3: Let $W_1^T = U_1 \Lambda_1 V_1^T$ and $W_2^T = U_2 \Lambda_2 V_2^T$ be the top r singular value decompositions of $W_1^T$ and $W_2^T$. From the standard result of linear algebra, $$\hat{W} = (U_1 \otimes U_2)(\Lambda_1 \otimes \Lambda_2)(V_1^T \otimes V_2^T)$$

is a singular value decomposition. The $\hat{W}$ satisfies $\|W - \hat{W}\|_F \leq \min_{Z|rank(Z)=r} \|W - Z\|_F$ since the diagonal elements of the matrix $\Lambda_1 \otimes \Lambda_2$ contain top r largest eigenvalues of $A_1 \otimes A_2$.

Thus, $$\|q^T\|_2 \leq \|q^T\|_1 = 1,$$

$$\|p\|_2 \leq \|p\|_1 = 1, \text{ and}$$

$$\|\Sigma_i a_i u_i u_i^T\|_F = \sqrt{tr(\Sigma_i a_i^2 u_i u_i^T)} = \sqrt{\Sigma_i a_i^2 \cdot tr(u_i u_i^T)} = \sqrt{\Sigma_i a_i^2} \leq \Sigma_i |a_i|$$

where the second equality comes from the Sherman-Morrison Lemma.

Referring to the time and the space complexities of Algorithm 3, note that the time complexity $O(d_n n^2 r^4 + nr + r^6)$ of Ark-L is smaller than the best exact algorithm's complexity $O(m^2 i_F)$ since $n \gg r$ and $n \gg d_n$.

More particularly, the time complexity of Ark-L takes $O(d_n n^2 r^4 + mr + r^6)$ time. Here, the top r decompositions in lines 1 and 2 cost $O(mr)$. Determining $\tilde{\Lambda}$ in line 3 takes $O(d_n n^2 r^4 + r^6)$. Determining lines 4, 5 and 6 takes $O(d_n nr + d_n r^4 + r^4)$.

Further, the space complexity of Ark-L uses $O(m + n^2 r^2)$ space. Here, the storage of $W_1$ and $W_2$ uses $O(m)$ space. The top r decompositions in lines 1 and 2 use $O(nr)$. Lines 5 to 8 use $O(n^2 r^2)$ space, thus making the total space complexity $O(m + n^2 r^2)$.

Experimental data follows.

The exact methods, both the conjugate gradient and the fixed point iterations have been run, where the one with a smaller running time were chosen. The graphs in Table 1 have been used with the following details: WWW-Barabasi—a Web graph snapshot of an educational domain; HEP-TH—a citation network in the area of theoretical high energy physics; and AS-Oregon—a router connection graph.

TABLE 1

| Name | Nodes | Edges |
|---|---|---|
| WWW-Barabasi | 325,729 | 2,207,671 |
| HEP-TH | 27,400 | 704,036 |
| AS-Oregon | 13,579 | 74,896 |

A decay factor c=0.1 was used for Ark-U and Ark-L, and c=0.0001 was used for Ark-U+ so that the fixed point iterations method converge. All the experiments were performed using a Linux machine with 48 GB memory, and quad-core AMD 2400 MHz central processing units (CPUs).

Referring to scalability, for each graph, the principal sub matrices (=upper, left part of the adjacency matrix) of different lengths were extracted, and the graph kernel was determined using the two copies of the extracted sub graph.

Figure 7:
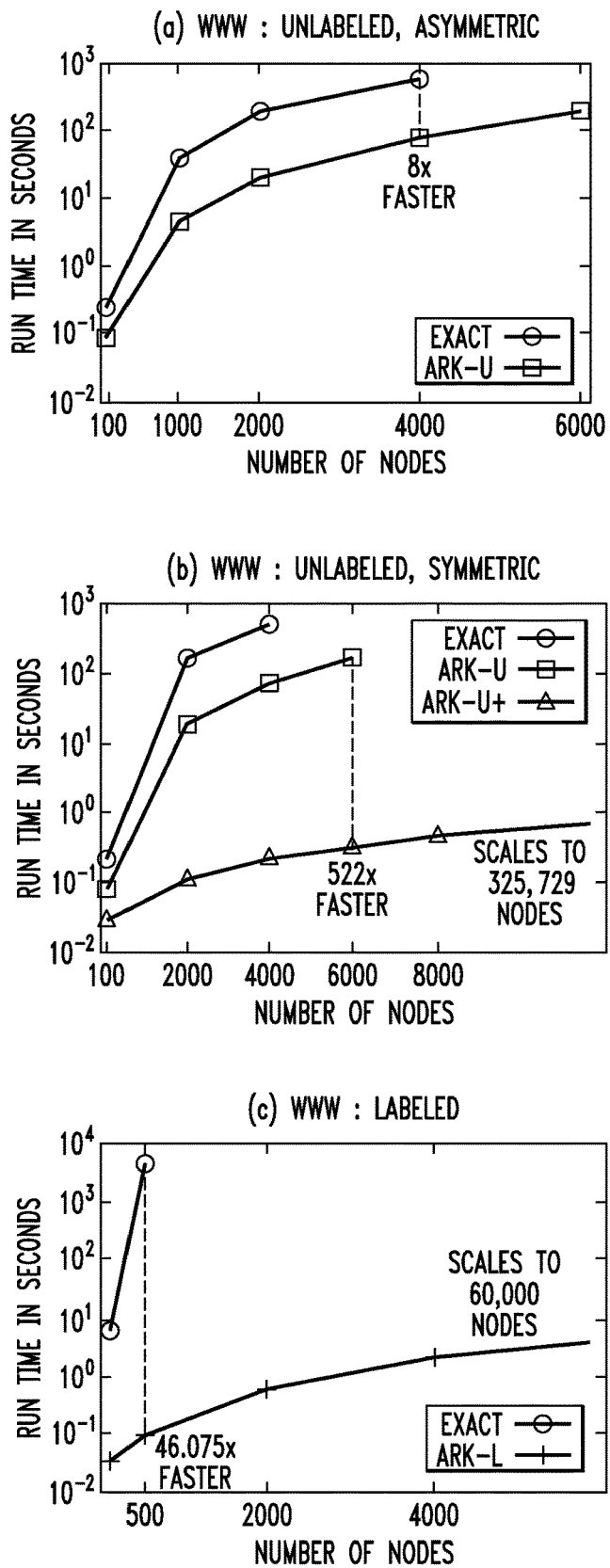
FIG. 7 shows the running time comparison of different methods according to an embodiment of the present disclosure.

FIG. 7 shows the running time comparison of our approximation vs. exact methods for real world graphs.

In the first column of FIG. 7, examples (a), (d) and (g), Ark-U is compared against the exact method on unlabeled, asymmetric graphs. Note that for all the graphs, Ark-U is about 6 times to 11 times faster than the exact method. The exact method is not plotted for all the number of nodes since it failed with the 'out of memory' error.

In the second column of FIG. 7, examples (b), (e) and (h), Ark-U+ is compared against the exact method and Ark-U on unlabeled, symmetric graphs. Note that for all the graphs, Ark-U+ is about 389 times to 522 times faster than the exact and Ark-U method. The exact and Ark-U method is not plotted for all the number of nodes since they failed with the 'out of memory' error.

In the third column of FIG. 7, examples (c), (f) and (i), Ark-L is compared against the exact method. Note that the plots for exact method have been omitted beyond 500 data points. According to the data, Ark-L is about 695 times to 97,865 times faster than the exact method.

The accuracy of Ark can be defined by the relative error of an approximation with regard to the exact kernel:

$$\text{accuracy} = \frac{|\hat{k}(G_1, G_2) - k(G_1, G_2)|}{k(G_1, G_2)}.$$

FIG. 8 shows the accuracy of different exemplary methods with respect to the number of nodes, wherein the number of eigenvalues set to 6. Note that for all the graphs, Ark gives more than 90% accuracies. Note also that only top 6 eigenvalues for a 2,000 node graph resulted in more than 91.3% accuracies.

FIG. 9 shows the accuracy of different exemplary methods with respect to the number of eigenvalues, the number of nodes to has been set to 500. Note that for all the graphs, Ark gives more than 90% accuracies. Note also that increasing the number of eigenvalues increase the accuracy.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module that infers a low-rank representation of a first graph and a second graph (see for example, FIG. 2B: 211), wherein the low-rank representations of the first and second graphs are stored in memory, a second module that estimates left, middle and right interactions between the first and second graphs (see for example, FIG. 2B: 212), wherein the estimations are based on the low-rank representations of the first and second graphs stored in memory, and a third module that aggregates the left interaction, the middle interaction and the right interaction into a kernel (see for example, FIG. 2B: 213), wherein the kernel is indicative of the similarity between the first and second graphs. Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 10:
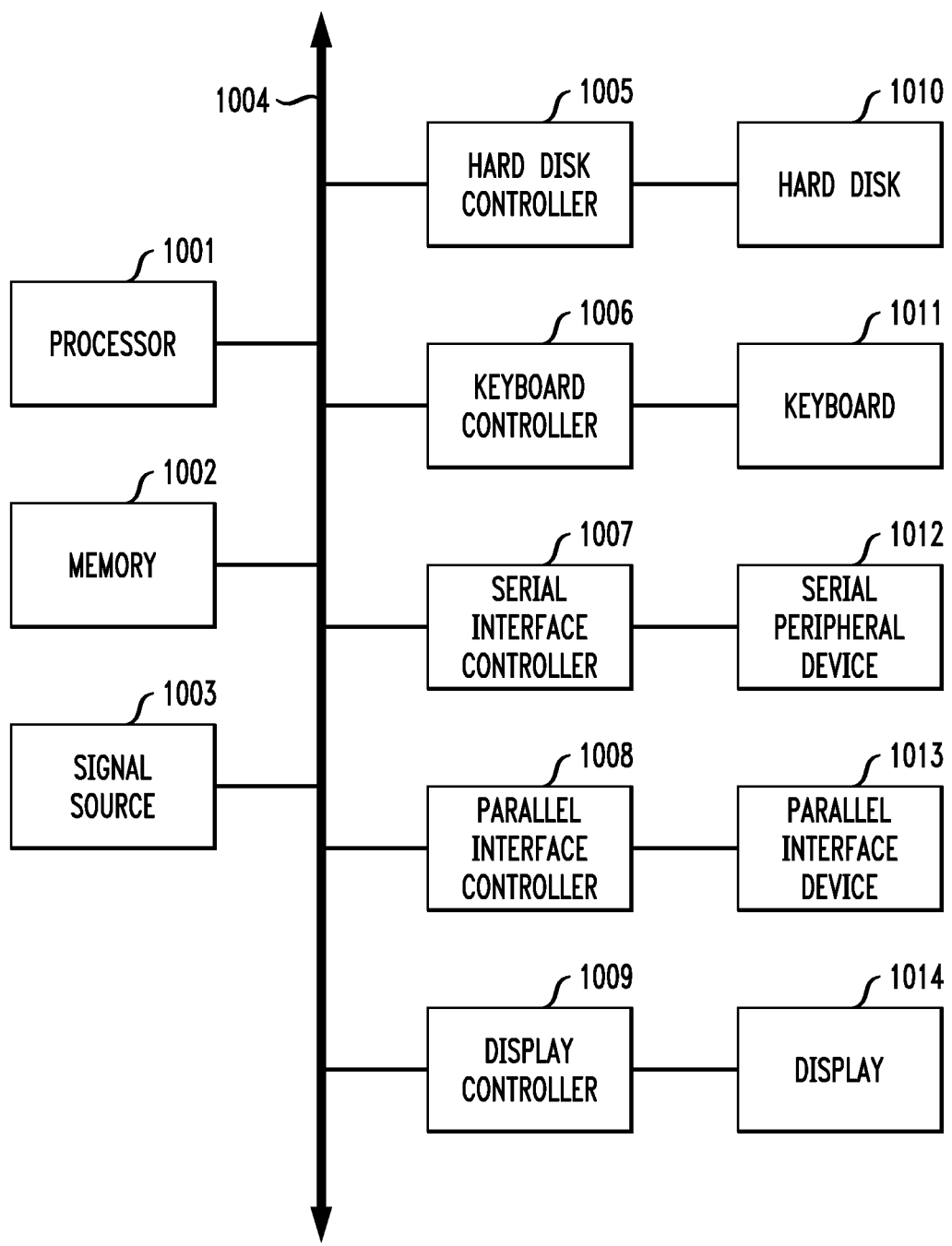
FIG. 10 is a block diagram depicting an exemplary computer system for determining a kernel according to an embodiment of the present disclosure.

For example, FIG. 10 is a block diagram depicting an exemplary computer system for detecting top-K simple shortest paths in a graph according to an embodiment of the present disclosure. The computer system shown in FIG. 10 includes a processor 1001, memory 1002, signal source 1003, system bus 1004, Hard Drive (HD) controller 1005, keyboard controller 1006, serial interface controller 1007, parallel interface controller 1008, display controller 1009, hard disk 1010, keyboard 1011, serial peripheral device 1012, parallel peripheral device 1013, and display 1014.

In these components, the processor 1001, memory 1002, signal source 1003, HD controller 1005, keyboard controller 1006, serial interface controller 1007, parallel interface controller 1008, display controller 1009 are connected to the system bus 1004. The hard disk 1010 is connected to the HD controller 1005. The keyboard 1011 is connected to the keyboard controller 1006. The serial peripheral device 1012 is connected to the serial interface controller 1007. The parallel peripheral device 1013 is connected to the parallel interface controller 1008. The display 1014 is connected to the display controller 1009.

In different applications, some of the components shown in FIG. 10 can be omitted. The whole system shown in FIG. 10 is controlled by computer readable instructions, which are generally stored in the hard disk 1010, EPROM or other non-volatile storage such as software. The software can be downloaded from a network (not shown in the figures), stored in the hard disk 1010. Alternatively, a software downloaded from a network can be loaded into the memory 1002 and executed by the processor 1001 so as to complete the function determined by the software.

The processor 1001 may be configured to perform one or more methodologies described in the present disclosure, illustrative embodiments of which are shown in the above figures and described herein. Embodiments of the present disclosure can be implemented as a routine that is stored in memory 1002 and executed by the processor 1001 to process the signal from the signal source 1003. As such, the computer system is a general-purpose computer system that becomes a specific purpose computer system when executing the routine of the present disclosure.

Although the computer system described in FIG. 10 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method of operating a computer system for determining a kernel representing a similarity between a plurality of graphs, wherein a capability of said computer system to store an exact kernel is constrained by a memory, the method comprising:
    inferring a first low-rank representation of a first graph representing a first object using a singular value decomposition;
    inferring a second low-rank representation of a second graph representing a second object using said singular value decomposition, wherein said low-rank representations of said first graph and said second graph are stored in said memory;
    estimating a left interaction between said first and second low-rank representations;
    estimating a middle interaction between said first and second low-rank representations;
    estimating a right interaction between said first and second low-rank representations; and
    aggregating said left interaction, said middle interaction and said right interaction into a kernel representing said similarity between said first and second graphs, and wherein said kernel is a stored in said memory.

2. The method of claim 1, wherein said inferring said low-rank representation of one of said first graph or said second graph further comprises determining a singular-value decomposition of said first graph or said second graph, respectively,
    wherein each said singular-value decomposition includes a left singular vector, a right singular vector and a diagonal elements of an adjacency matrix generated based on the respective graph,
    wherein said left interaction between said first and second graphs is an interaction determined using said respective left singular vectors corresponding to said first graph and said second graph,
    wherein said right interaction between said first and second graphs is an interaction determined using said respective right singular vectors corresponding to said first graph and said second graph, and
    wherein said middle interaction between said first and second graphs is an interaction determined using said diagonal elements corresponding to said first graph and said second graph.

3. The method of claim 1, wherein said estimating said left interaction between said first and second graphs further comprises conducting a linear operation between a stopping vector and a left matrix of said first graph and a stopping vector and a left matrix of said second graph.

4. The method of claim 1, wherein said estimating said right interaction between said first and second graphs further comprises conducting a linear operation between a starting vector and a right matrix of said first graph and a starting vector and a right matrix of said second graph.

5. The method of claim 1, wherein said estimating said middle interaction between said first and second graphs further comprises conducting a linear operation between a left matrix, a right matrix and a middle matrix of said first graph and a left matrix, a right matrix and a middle matrix of said second graph.

6. The method of claim 1, wherein aggregating said left, middle and right interactions to output a similarity between said first and second graphs further comprises:
    conducting a linear operation between a starting vector and a stopping vector of said first graph and a starting vector and a stopping vector of said second graph; and
    conducting a linear operation between said left interaction, said right interaction and said middle interaction of said first graph and said left interaction, said right interaction and said middle interaction of said second graph.

7. The method of claim 1, wherein said inferring said low-rank representation of one of said first graph or said second graph further comprises determining an eigen-value decomposition of said first graph or said second graph, respectively.

8. The method of claim 1, wherein said estimating said middle interaction between said first and second graphs further comprises conducting a linear operation between said middle matrix of said first graph and said middle matrix of said second graph.

9. The method of claim 1, wherein said estimating said left interaction between said first and second graphs further comprises conducting a linear operation between a stopping vector, a label matrix and a left matrix of said first graph and a stopping vector, a label matrix and a left matrix of said second graph.

10. The method of claim 1, wherein said estimating said right interaction between said first and second graphs further comprises conducting a linear operation between a starting vector, a label matrix and a right matrix of said first graph and a starting vector, a label matrix and a right matrix of said second graph.

11. The method of claim 1, wherein said estimating said middle interaction between said first and second graphs further comprises conducting a linear operation between a label matrix, a left matrix, a right matrix and a middle matrix of said first graph and a label matrix, a left matrix, a right matrix and a middle matrix of said second graph.

12. The method of claim 1, wherein aggregating said left interaction, said middle interaction and said right interaction to output said similarity between said first graph and second graph further comprises:
conducting a linear operation between a label matrix, a starting vector and a stopping vector of said first graph and a label matrix, a starting vector and a stopping vector of said second graph; and
conducting a linear operation between said label matrix, said left interaction, said right interaction and said middle interaction of said first graph and said label matrix, said left interaction, said right interaction and said middle interaction of said second graph.

13. The method of claim 1, further comprising providing a system, wherein said system comprises distinct software modules, and wherein said distinct software modules comprise a inference module inferring said low-rank representations of said first graph and said second graph, an estimation module estimating said left interaction, said middle interaction and said right interaction, and an aggregation module aggregation said left interaction, said middle interaction and said right interaction and outputting said kernel.

14. A method of operating a computer system for building and storing an index representing similarities between a first graph and a second graph, wherein a memory of said computer system is insufficient to store an exact kernel representing said similarities between said first and second graphs, the method comprising:
inferring a low-rank representation of each of said first graph and said second graph, each of said low-rank representations including a left matrix, a middle matrix, and a right matrix, wherein said low-rank representations are stored in a memory;
estimating a left interaction by conducting a first linear operation between side information and said left matrices based on said low-rank representations stored in said memory;
estimating a right interaction by conducting a second linear operation between said side information and said right matrices based on said low-rank representations stored in said memory;
estimating a middle interaction between said left matrices and said right matrices based on said low-rank representations stored in said memory; and
aggregating said left interaction, said middle interaction and said right interaction to output said index, wherein said index is stored in said memory.

15. The method of claim 14, further comprising applying said index as a kernel in a random-walk based determination to determine a number of common walks in said first graph and said second graph.

16. The method of claim 14, further comprising determining a similarity between said first graph and said second graph based on said index.

17. The method of claim 14, wherein said first graph and said second graph are different portions of a common graph.

18. The method of claim 14, wherein said side information comprises a stopping vector and a starting vector.

19. The method of claim 14, wherein said side information comprises a label matrix, a stopping vector and a starting vector.

20. The method of claim 14, further comprising providing a system, wherein said system comprises distinct software modules, and wherein said distinct software modules comprise a inference module inferring said low-rank representations of said first graph and said second graph, an estimation module estimating said left interaction, said middle interaction and said right interaction, and an aggregation module aggregation said left interaction, said middle interaction and said right interaction and outputting said index.

21. A method of operating a computer system for comparing a plurality of graphs, wherein a memory of said computer system is insufficient to store an exact kernel representing a comparison of said plurality of graphs, said method comprising steps of:
obtaining feature data of a first graph and a second graph;
representing said feature data in a matrix, and storing said matrix in said memory;
decomposing said matrix into a plurality of submatrices; and
cross-comparing entries of said plurality of submatrices at a left, a middle, and a right of each matrix of said plurality of submatrices and determining a similarity between said first graph and said second graph.

22. The method of claim 21, wherein each of said plurality of submatrices are approximated by a respective low-rank representation.

23. The method of claim 21, further comprising inverting a product of said plurality of matrices.

* * * * *